United States Patent [19]

Vermeer et al.

[11] 4,172,354
[45] Oct. 30, 1979

[54] MACHINE FOR FORMING LARGE ROUND BALES OF CROP MATERIAL

[75] Inventors: Stanley J. Vermeer; Arnold Mathes, both of Pella, Iowa

[73] Assignee: Vermeer Manufacturing Company, Pella, Iowa

[21] Appl. No.: 763,589

[22] Filed: Jan. 28, 1977

[51] Int. Cl.² ............... A01D 39/00; B30B 5/06
[52] U.S. Cl. .......................... 56/341; 100/88
[58] Field of Search ............ 56/341, 343, DIG. 21; 100/88

[56] References Cited

U.S. PATENT DOCUMENTS

| | | | |
|---|---|---|---|
| 3,722,197 | 3/1973 | Vermeer | 100/88 |
| 3,788,053 | 1/1974 | Bonnett | 56/DIG. 21 |
| 3,792,574 | 2/1974 | Best | 56/341 |
| 3,815,344 | 6/1974 | Kucera | 56/341 |
| 3,895,573 | 7/1975 | Phillips et al. | 100/88 |
| 3,897,841 | 8/1975 | Phillips et al. | 56/341 |
| 3,914,926 | 10/1975 | Braunberger et al. | 56/341 |
| 3,924,391 | 12/1975 | Cheatum | 56/341 |
| 3,931,702 | 1/1976 | Soteropulos et al. | 56/341 |
| 3,939,631 | 2/1976 | Blanshine | 56/341 |
| 3,981,391 | 9/1976 | Phillips et al. | 56/341 |
| 4,009,653 | 3/1977 | Sacht | 56/341 |
| 4,077,315 | 3/1978 | Meiers | 100/88 |
| 4,088,069 | 5/1978 | Soteropulos | 100/88 |

*Primary Examiner*—Louis G. Mancene
*Assistant Examiner*—Paul J. Hirsch
*Attorney, Agent, or Firm*—Rudolph L. Lowell

[57] ABSTRACT

A machine for forming large round bales has a pickup device for gathering and delivering a windrowed crop material onto the upper surface of a bale supporting drum roller situated immediately rearwardly of the pickup device with only a working clearance between their oppositely moving adjacent surfaces. Material is moved rearwardly on the bale supporting roller into a bale forming zone for engagement with forwardly moving lower runs of an endless belt assembly. A bale starter roller, situated upwardly and forwardly from the bale supporting roller, rotates in a direction to sweep and direct material from the underside of the lower belt runs into the bale forming zone for coaction with the endless belt assembly to form a rolled bale.

10 Claims, 8 Drawing Figures

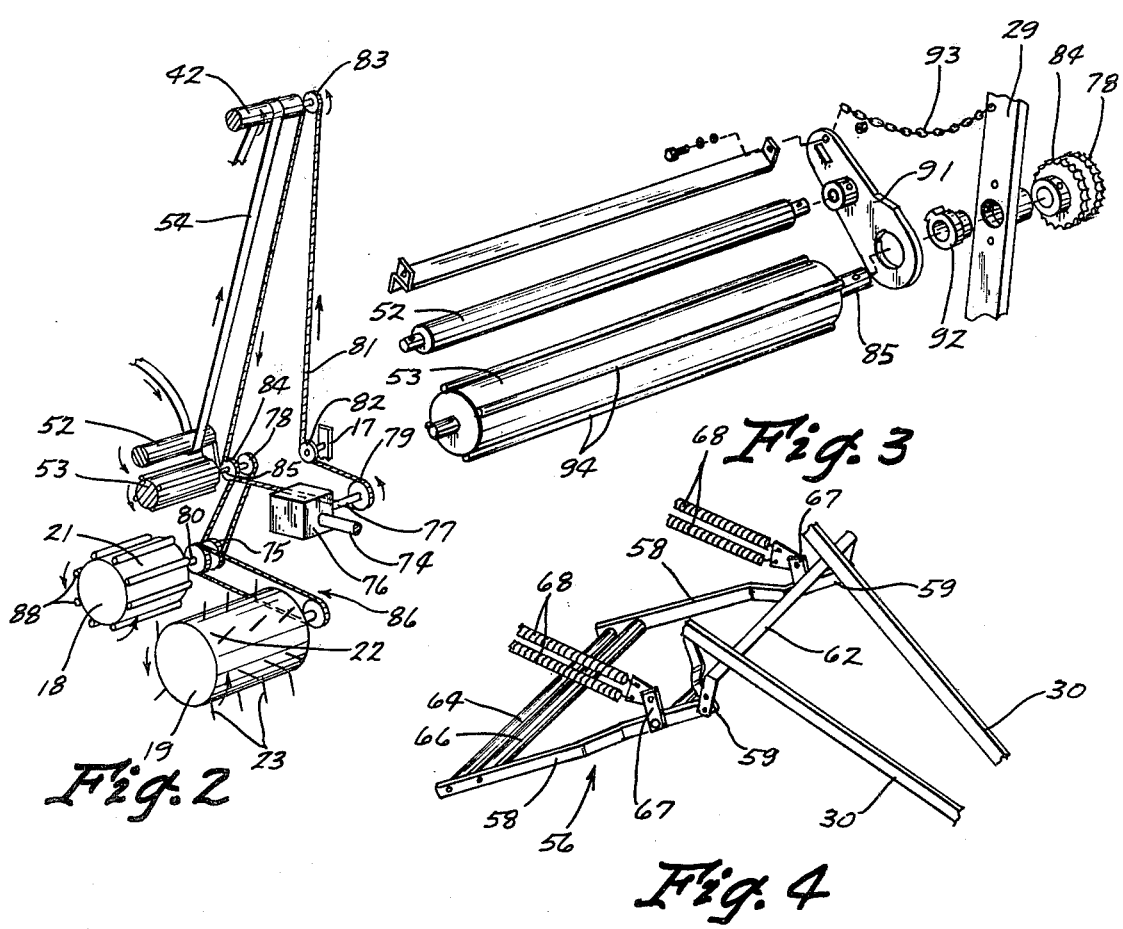

MACHINE FOR FORMING LARGE ROUND BALES OF CROP MATERIAL

SUMMARY OF THE INVENTION

The invention provides a machine of a rugged and compact construction capable of gathering windrowed crop material and delivering the same to a bale forming zone above a bale supporting roller. Positive bale starting action is assured by a bale starter roller at the front of the bale forming zone which functions to sweep material from the lower belt runs downwardly into the bale forming zone to assist in turning and rolling the initial material to form the core of a round bale. In addition to its bale starting function, the starter roller provides an inherent safety feature by eliminating the material compression rollers at the inlet of the bale forming zone. Also eliminated is the concomitant problem of plugging at the compression rollers due to foreign objects such as sticks and stones or material accumulations in the windrow. As a bale is progressively enlarged within the machine, it expands rearwardly so as to be supported on both the bale supporting roller and the bottom rollers of the rear end gate structure. Accordingly, a completed bale is easily discharged by gravity upon upward pivotal movement of the end gate structure.

BRIEF DESCRIPTION OF THE DRAWINGS

FIG. 2 is a diagrammatic perspective view of the power transmission system of the bale forming machine;

FIG. 3 is an exploded perspective view of the bale starter roller assembly;

FIG. 4 is a perspective view of the belt tensioning unit for the endless belt assembly;

DETAILED DESCRIPTION OF THE INVENTION

Figure 1:
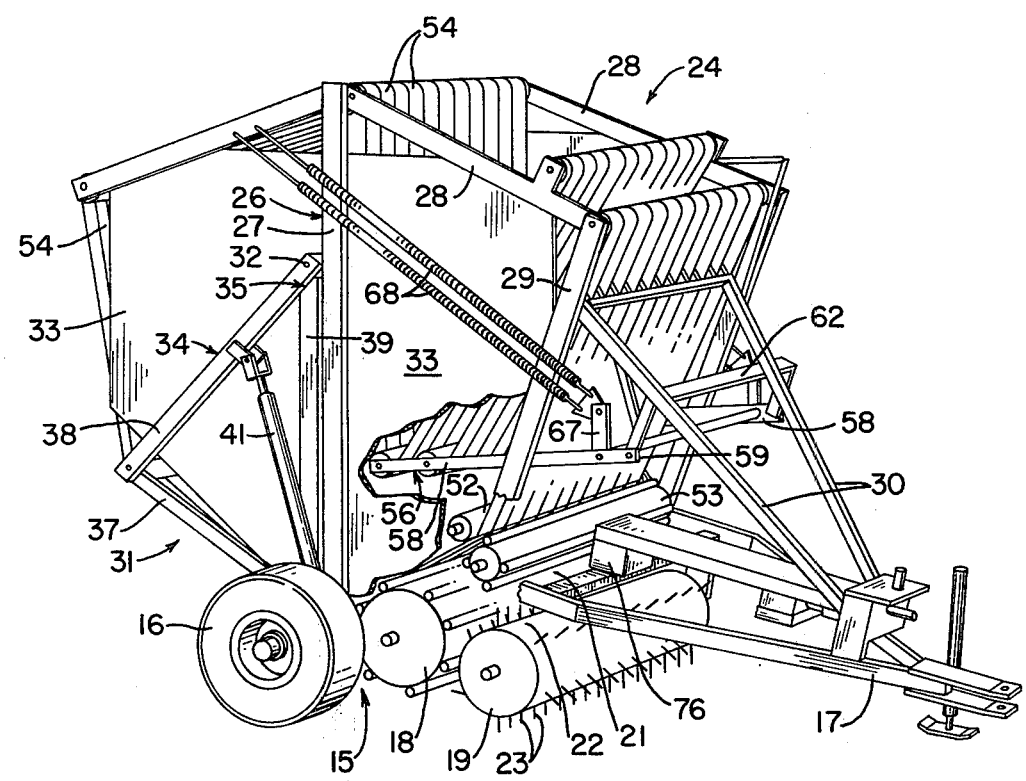
FIG. 1 is a side perspective view of the bale forming machine of this invention with parts broken away to show various elements in their assembled relation.

The round bale forming machine of this invention includes a portable frame 15 (FIG. 1) equipped with a pair of ground wheels 16 and a tongue structure 17 for connection to a usual farm tractor (not shown). A large drum roller or bale supporting roller 18 is rotatably supported on and extended transversely of the frame 15 at a position ahead of the ground wheels 16. Rotatably mounted on the portable frame 15 forwardly of the bale supporting roller 18 is a transverse material pickup device 19 which may have retractible fingers 23 for gathering a windrowed crop material for delivery to the upper peripheral surface 21 of the bale supporting roller 18. The bale supporting roller 18 and material pickup device 19 are relatively arranged with only a working clearance between the bale supporting roller 18 and the retractible fingers 23. The mechanism for retracting the fingers 23 as they travel about the rear side of the pickup device 19 is well-known. The pickup device 19 may be mounted for support at various adjusted positions depending on the type and condition of material to be baled but is generally situated with its upper surface 22 lower than the upper surface 21 of the bale supporting roller 18.

An upright frame assembly, indicated generally at 24, (FIGS. 1 and 5) is mounted on the frame 15 and includes a pair of transversely spaced upright T-shaped frame side members 26, each of which has an upright stem or post member 27 and a longitudinally extended arm member 28. Each post member 27 is secured at its lower end to the frame 15 rearwardly of the bale supporting roller 18. A front upright brace member 29 interconnects the forward end of each arm member 28 with a front portion of the frame 15. An inclined tongue brace 30 interconnects an upper portion of each brace member 29 with a forward portion of the tongue structure 17. Each center post 27, cross arm 28 and front brace member 29 are interconnected by an upright bale confining side plate 33 (FIG. 1).

Figure 5:
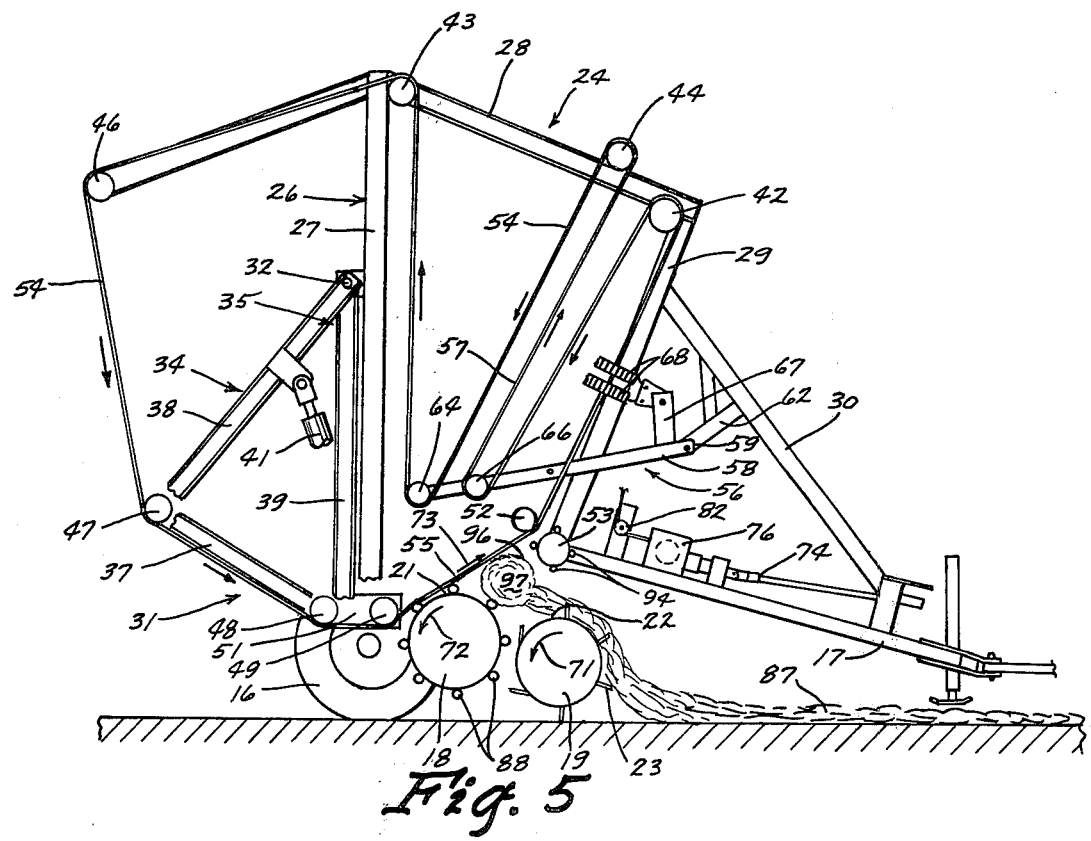
FIG. 5 is a longitudinal sectional view of the baling machine showing parts of the machine in their relative positions for initiating the forming of a bale.

A rear end gate structure 31 (FIGS. 1 and 5) is pivotally supported at 32 on the upright post members 27 for up and down pivotal movement for a purpose to appear later. The rear end gate structure 31 includes a pair of transversely opposite triangular shaped frame sections 34, each of which has an apex portion 35 thereof pivotally supported at 32 on the rear side of a respective upright post member 27. For convenience, the leg member 37 opposite the pivoted apex portion 35 formed by the leg members 38 and 39 will be referred to as the base member 37 of a triangular frame section 34. A hydraulic cylinder unit 41 is interconnected between each leg member 38 and the frame 15 for pivoting the triangular frame sections 34 in unison about a common axis extended transversely of the frame 15 at the pivots 32. Thus, the rear end gate structure 31 is movable toward and away from a closed bale forming position, as shown in FIGS. 1 and 5, wherein leg members 39 are in substantially upright positions with their lower ends adjacent the bale supporting roller 18.

Extended between and rotatably carried on the arm members 28 of the T-shaped side members 26, are a series of transverse belt supporting rollers including a drive roller 42 at the forward ends of the arm members 28, an idler roller 43 adjacent the front side of the upright post members 27, an idler roller 44 carried at an elevated position intermediate the rollers 42 and 43 and an idler roller 46 at the rear ends of the arm members 28.

Additional transverse belt supporting rollers are supported on the rear end gate structure 31 including idler rollers 47 and 48 at opposite ends of the base members 37 and an idler roller, hereinafter referred to as the bottom roller 49, carried on brackets 51 extended forwardly from the lower ends of the leg members 39 and located adjacent to and rearwardly of the bale supporting roller 18 when the rear end gate structure 31 is in its closed bale forming position. A belt supporting idler roller, hereinafter referred to as the lower front roller 52, is arranged upwardly and forwardly of the bale supporting roller 18.

As best shown in FIG. 1, a series of flat belts 54 are trained about all of the transverse belt supporting rollers in a spaced relation longitudinally of the rollers. At the initiation of the bale forming operation, the bottom roller 49 and lower front roller 52 are located so that a lower run or lower length 55 of the belts 54 travels upwardly and forwardly from roller 49 to roller 52 with the bottom portion thereof contiguous to the upper surface 21 of the bale supporting roller 18 (FIG. 5).

Since the belts 54 are of a greater length than the circumferential length of the frame structure 24, a belt tension unit, indicated at 56, is provided to take up the slack 57 in the belts 54 and to maintain tension in the belts at all times during a bale forming operation. The belt tension unit includes a pair of transversely spaced rearwardly extended arms 58 pivotally supported at their front ends at 59 on a transverse tension unit support member 62 secured to the underside of the inclined tongue braces 30. A pair of idler rollers 64 and 66 (FIG. 5) are rotatably supported between the rear ends of the arms 58 within the frame structure 24. Upstanding levers 67 on the forward ends of the arms 58 are connected by tension springs 68 (FIG. 1) to the cross arms 28 for biasing the arms 58 downwardly to maintain tension in the belts 54.

In operation, the pickup device 19 and bale supporting roller 18 are rotated in a counterclockwise direction as indicated by arrows 71 and 72, respectively, in FIG. 5. The belts 54 travel about the belt supporting rollers for movement of their lower runs 55 in a forward and upwardly inclined direction as indicated by arrow 73 in FIG. 5. The machine is operated from the power take-off of a tractor through a power transmission system illustrated diagrammatically in FIG. 2. The tractor power take-off is connected to an input shaft 74 of a gear unit 76 having an output or drive shaft 77. A gear 79 on the drive shaft 77, through an endless chain 81, drives an idler gear 82 mounted on the tongue structure 17, a gear 83 on the belt supporting drive roller 42 and a gear 84 mounted on the shaft 85 for the bale starter roller 53. Also mounted on the shaft 85 is a gear 78 in chain connection with a gear 75 on the shaft 80 of the support roller 18. The rotary pickup device 19 is driven directly from the bale supporting roller 18 through a gear and chain assembly 86.

Referring to FIG. 5, as the machine is advanced windrowed material, indicated at 87, is engaged and lifted by the rotating pickup device 19 and moved rearwardly on the upper surface 22 thereof for delivery to the upper peripheral surface 21 of the bale supporting roller 18. The peripheral surface 21 may be rubber coated, roughened or otherwise formed so as to frictionally engage the material. As shown in the drawing the peripheral surface 21 is provided with a series of circumferentially spaced longitudinally extended rods or bars 88 welded to the periphery of the bale supporting roller 18 for engaging and moving material from the pickup device 19. The material on the upper peripheral surface 21 of the bale supporting roller 18 is moved into engagement with the forwardly and upwardly moving lower runs 55 of the belts 54 and rolled in a clockwise direction, as viewed in FIG. 5, within a bale forming zone 96 formed by the belt runs 55, bale supporting roller 18 and starter roller 53.

The initial forming or starting of the bale is assured by the provision of the bale starter roller 53 which extends transversely of the frame 15 at a position below and in a belt clearance relation with the lower front roller 52. The shaft 85 of the starter roller 53 is extended between and rotatably supported on the front upright brace members 29 (FIG. 3) with the gears 78 and 84 fixed on one end of the shaft 85. The lower front roller 52 extends between and is rotatably supported on a pair of rock arms 91 that may be pivotally mounted on the starter roller shaft 85 by bearings 92 so that the lower front roller 52 is pivotally movable longitudinally of he frame 15 about the axis of and above the starter roller 53 in a belt clearance relation therewith. Rearward and downward pivotal movement of the lower front roller 52 is limited by stop chains 93 connected between the front brace members 29 and rock arms 91.

At the start of a bale forming operation (FIG. 5), the lower front roller 52 (FIG. 5) is positioned upwardly and rearwardly of the starter roller at about an angle of 45° to the horizontal and at a distance such that a series of axially extended circumferentially spaced rods or bars 94 on the peripheral surface of the starter roller 53 are engageable with the underside of the upper portions of the lower belt runs 55. The bars 94 provide a friction surface on the starter roller 53 for positively engaging the material so that any hay tending to travel forwardly with the lower belt runs is swept downwardly by the starter roller 53 into the bale forming zone 96. Thus the initial material delivered from the pickup device 19 is moved rearwardly on the bale supporting roller 18, upwardly and forwardly by the lower belt runs 55 and then downwardly to the bale supporting roller 18 by the starter roller 53. This downward directing of material by the roller 53 at the forward end of the bale forming zone 96 compliments the bale forming action of the roller 18 and belt runs 55 in rolling the initial material within the bale forming zone to form the core of a bale. As the diameter of the bale increases, the bale may effect a forward pivotal movement of the lower front roller 52 relative to the starter roller 53 as shown in FIG. 6 whereupon the enlarged bale 97 may engage the starter roller 53.

Figure 6:
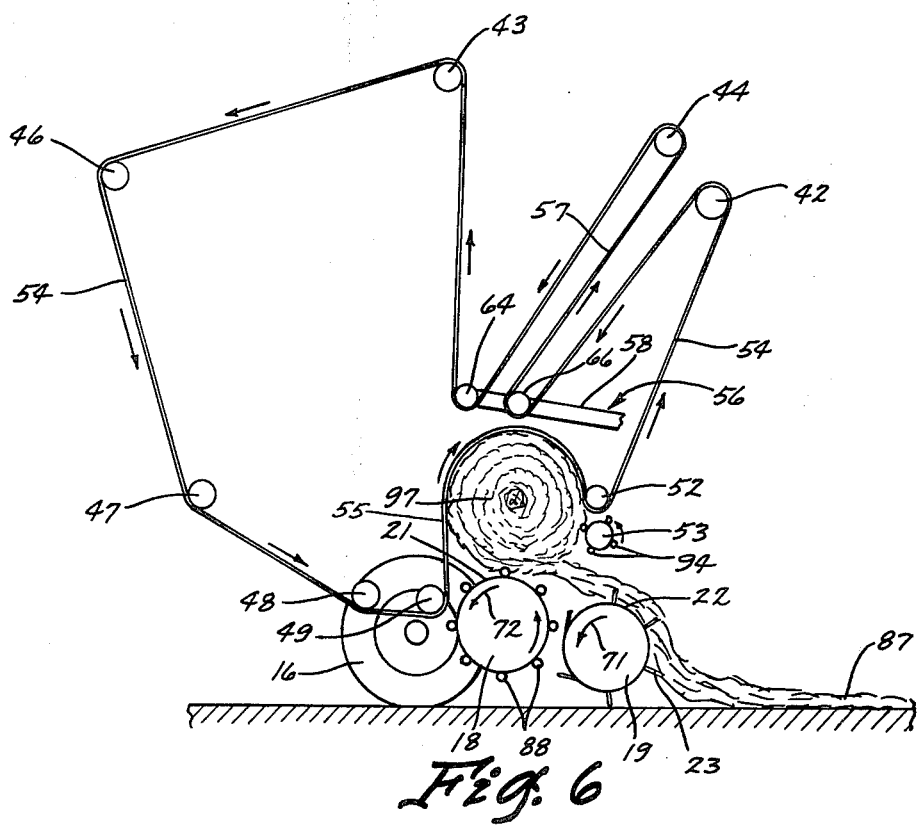
FIG. 6 is a diagrammatic illustration showing parts of the machine in their relative positions after the bale forming operation has been initiated.
Figure 7:
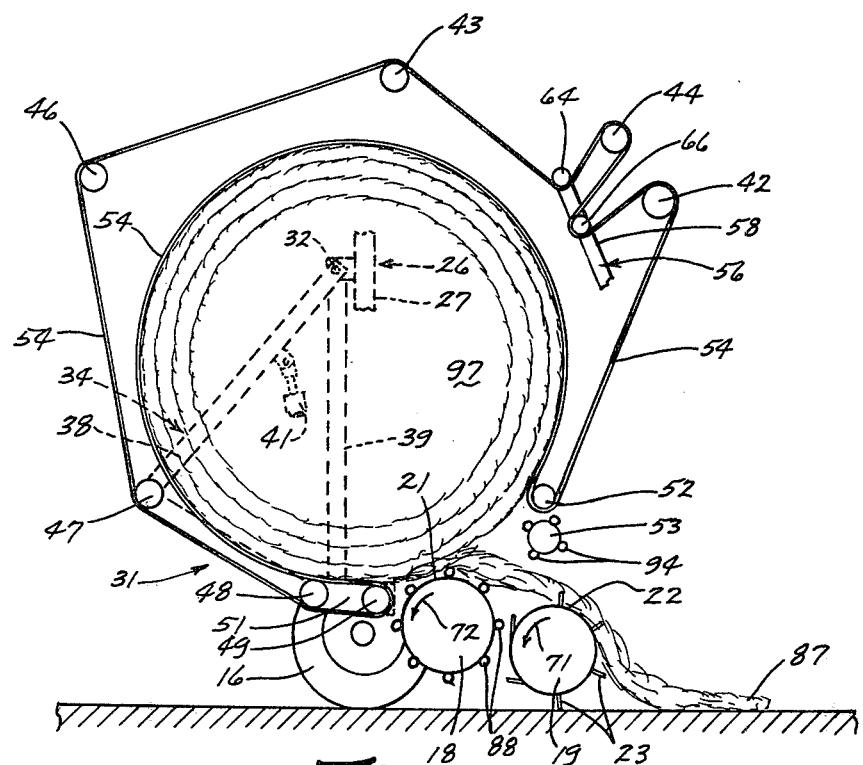
FIG. 7 is illustrated similarly to FIG. 6 and shows the parts in their relative positions when the bale is formed.

Progressive enlargement of the bale 97 from the intermediate size shown in FIG. 6 to the size of a completed bale, as shown in FIG. 7 effects a progressive rearward expansion of the enlarged bale 97 so that as the bale attains approximately one third of its completed size, a portion of its weight is shifted onto the bottom roller 49 on the rear end gate structure 31. Continued rearward expansion may move the bale onto the adjacent idler roller 48. Thus, the bale supporting roller 18, bottom roller 49 and idler roller 48 all cooperate to support a completed bale on the portable frame 15. In some instances, a bale may also rest against the rear end gate roller 47.

Figure 8:
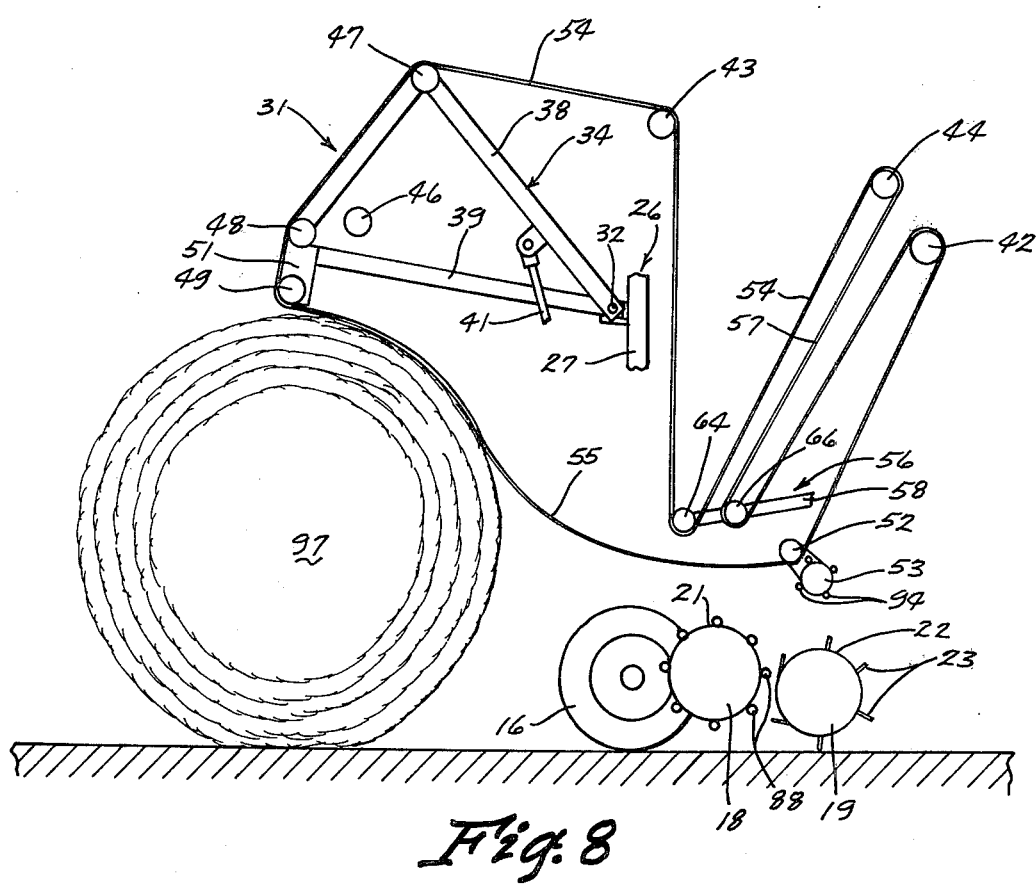
FIG. 8 is a diagrammatic illustration showing the positions of parts of the machine when the formed bale is ejected from the machine.

To discharge the completed bale from the machine, it is only necessary therefor to actuate the hydraulic cylinders 41 (FIG. 8) to pivot the rear end gate structure 31 upwardly and rearwardly about its pivot 32 until the bottom roller 49 is in a clearance relation with the bale to be ejected. With the bottom roller 49 thus removed from its bale supporting position, the bale supporting roller 18 coacts with the force of gravity to move the completed bale rearwardly out of the machine for dropping to the ground. The hydraulic cylinders 41 are then retracted to return the gate structure 31 to its bale forming position.

Although the invention has been described with respect to a preferred form thereof, it is to be understood that it is not to be so limited since changes can be made therein which are within the full intended scope of this invention as defined by the appended claims.

We claim:

1. A machine for forming a round bale of windrowed crop material comprising:

(a) a portable frame having an upright frame assembly with a forward end, (b) a bale supporting means supported on said portable frame having an upper movable surface, (c) a plurality of transverse belt engaging rollers arranged about said frame assembly including a bottom rear roller and a lower front roller located upwardly from the bale supporting means, (d) pivotally movable means supporting the rear roller at a position adjacent to and behind the bale supporting means when a bale is being formed, and pivotally movable upwardly and rearwardly, when a bale is completed, to discharge the bale from the bale supporting means, (e) a continuous belt means trained about said plurality of rollers for travel longitudinally and vertically of said frame, said belt means having a lower contractible and extendible length between said lower front roller and bottom roller which, when a bale is to be formed, is inclined upwardly and forwardly from the bottom roller, with the upper portion thereof located above said bale supporting means, (f) a transverse material pickup device on said portable frame located adjacent to and in front of the bale supporting means, (g) a transverse bale starter roller rotatably mounted on the frame assembly downwardly from said lower front roller with the peripheral surface thereof adjacent the underside of the upper portion of said lower length of the belt means, (h) said starter roller, lower length of the belt means and upper surface of the bale supporting means defining a bale forming zone having an open inlet portion, between said starter roller and material pickup device, for receiving windrowed material directly from said pickup device, (i) means for moving the upper surface of said bale supporting means in a direction opposite to the direction of movement of the lower length of said belt means whereby the material received through said open inlet portion into said bale forming zone is moved by said bale supporting means into engagement with said belt means and rotated to form a round bale, (j) means for rotating said starter roller in a direction opposite to the direction of movement of the lower length of said belt means to sweep and direct any material on the lower length of said belt means rearwardly into said bale forming zone, with any material moved forwardly toward said inlet portion by said starter roller being moved rearwardly toward the baling zone by said pickup device, and (k) means for yieldably extending and retracting the lower length of said belt means in response to the progressive diametrical enlargement of a bale to provide for the travel of said lower length about the upper peripheral portion of the bale.

2. A machine for forming a round bale according to claim 1, including:

(a) means on the peripheral surface of the bale starter roller for frictionally engaging the material moved thereagainst by said belt means.

3. A machine for forming a round bale according to claim 1, wherein:

(a) the bale, on progressive diametrical enlargement thereof is progressively expanded rearwardly on said bale supporting means so that an enlarged bale is supported on said bale supporting means and bottom roller.

4. A machine for forming a round bale according to claim 1, including:

(a) means for supporting the lower front roller on the frame assembly for fore and aft movement above said starter roller in a belt clearance relation therewith.

5. A machine for forming a round bale according to claim 4, wherein:

(a) said lower front roller is pivotally movable in a forward direction in response to a diametrical enlargement of the bale from a position located upwardly and rearwardly of the bale starter roller to a position above the bale starter roller.

6. A machine for forming a round bale according to claim 1, wherein:

(a) said lower front roller is pivotally movable in a fore and aft direction about the axis of said starter roller.

7. A machine for forming a round bale according to claim 1, wherein:

(a) said bale supporting means comprises a single transverse bale supporting roller rotatably supported on said portable frame.

8. A machine for forming a round bale according to claim 7, including:

(a) means on the peripheral surface of the bale supporting roller for frictionally engaging the material to be baled.

9. A machine for forming a round bale according to claim 7, wherein:

(a) the upper surface of the transverse bale supporting roller is contiguous to the bottom portion of said lower length of the belt means when a bale is to be formed.

10. A machine for forming a round bale of windrowed crop material comprising:

(a) a portable frame having an upright frame structure with a forward end, (b) a bale supporting means supported on said portable frame having an upper movable surface, (c) a plurality of rotatable support members for a flexible bale engaging assembly arranged about said frame structure including rear bottom rotatable support members and lower front rotatable support members located upwardly from the bale supporting means, (d) means for supporting said bottom rotatable support members at a position adjacent to and behind the bale supporting means when a bale is being formed, and pivotally movable upwardly and rearwardly when, a bale is completed, to discharge the bale from the bale supporting means, (e) a continuous flexible bale engaging assembly carried on said rotatable support members for travel longitudinally and vertically of said frame structure, said bale engaging assembly having a lower contractible and extendible length between said lower front rotatable support members and bottom rotatable support members which, when a bale is to be formed, is inclined upwardly and forwardly from the bottom rotatable support members, with the upper portion thereof located above said bale supporting means, (f) a transverse material pickup device on said portable frame located adjacent to and in front of the bale supporting means, (g) a transverse bale starter roller rotatably mounted on the frame structure, downwardly from said lower front rotatable support members, with the peripheral surface thereof adjacent the underside of the upper portion of said lower length of the bale engaging assembly, (h) said starter roller, lower length of the bale engaging assembly and upper surface of the bale supporting means defining a bale forming zone having an open inlet portion between said starter roller and material pickup device for receiving windrowed material directly from said pickup device, (i) means for moving the upper surface of said bale supporting means in a direction opposite to the direction of movement of the lower length of said bale engaging assembly whereby the material received through said open inlet portion into said bale forming zone is moved by said bale supporting means into engagement with said bale engaging assembly and rotated to form a round bale, (j) means for rotating said starter roller in a direction opposite to the direction of movement of the lower length of said bale engaging assembly to sweep and direct any material on the lower length of said bale engaging assembly rearwardly into said bale forming zone, with any material moved forwardly toward said inlet portion by said starter roller, being moved rearwardly into the bale forming zone by said pickup device, and (k) means for yieldably extending and retracting the lower length of said bale engaging assembly in response to the progressive diametrical enlargement of a bale to provide for the travel of said lower length about the upper peripheral portion of the bale.

* * * * *